No. 897,826. PATENTED SEPT. 1, 1908.
H. J. GILBERT.
DRIVING MECHANISM.
APPLICATION FILED JAN. 13, 1906.
2 SHEETS—SHEET 2.
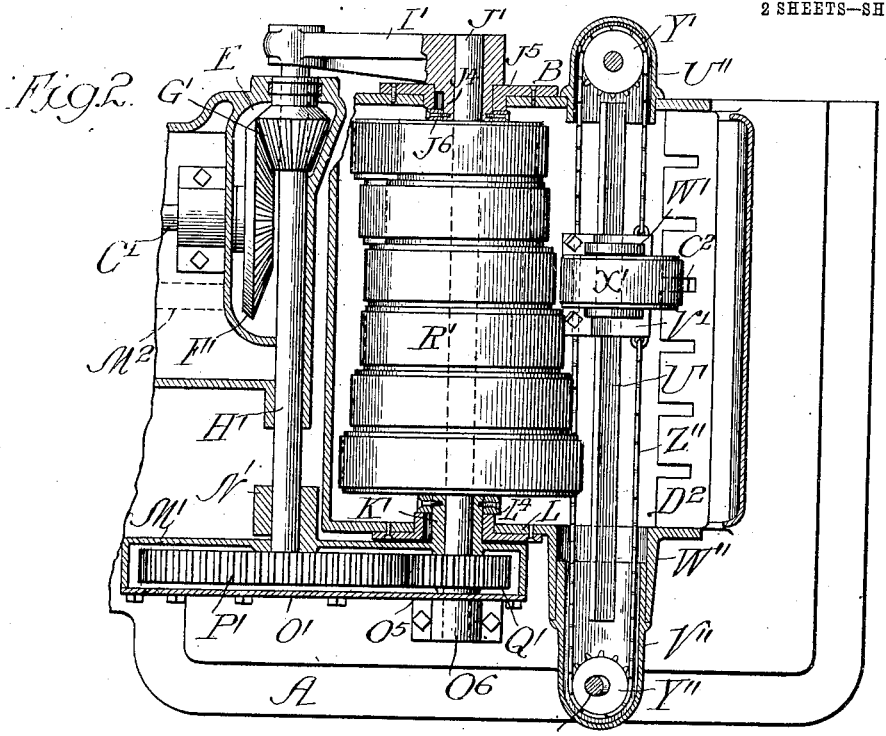
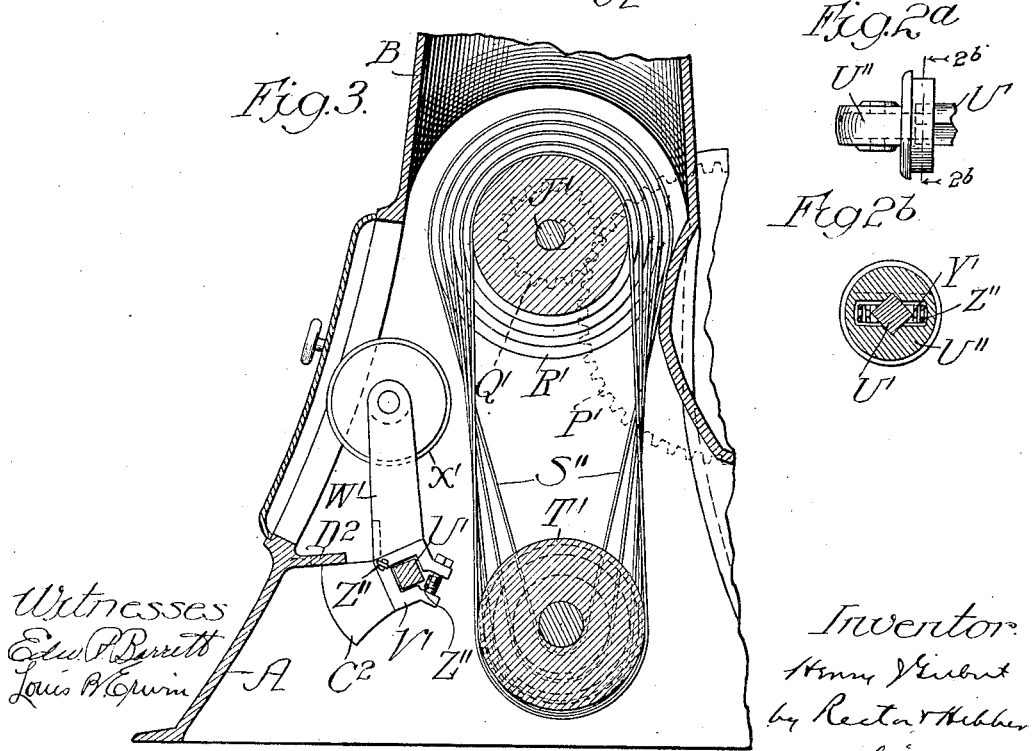
Witnesses
Inventor

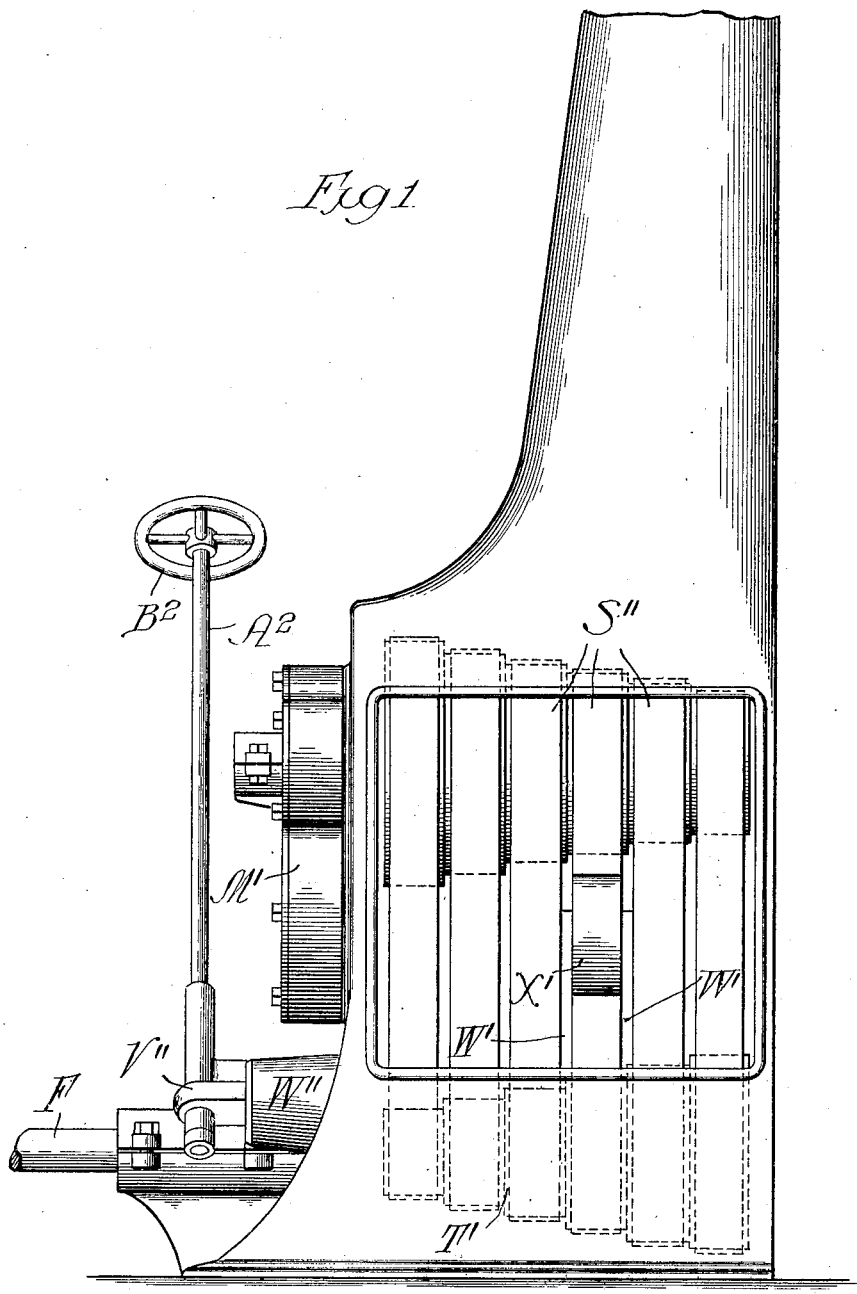

UNITED STATES PATENT OFFICE.

HENRY J. GILBERT, OF SAGINAW, MICHIGAN, ASSIGNOR TO WILLIAM B. MERSHON AND COMPANY, OF SAGINAW, MICHIGAN, A CORPORATION OF MICHIGAN.

DRIVING MECHANISM.

No. 897,826.   Specification of Letters Patent.   Patented Sept. 1, 1908.

Original application filed September 8, 1896, Serial No. 605,049. Divided and this application filed January 13, 1906. Serial No. 295,944.

*To all whom it may concern:*

Be it known that I, HENRY J. GILBERT, a citizen of the United States, residing at Saginaw, in the county of Saginaw and State of Michigan, have invented a certain new and useful Improvement in Driving Mechanisms, of which the following is a description, reference being had to the accompanying drawings, forming part of this specification.

This application for Letters Patent is a division of application Serial Number 605,049 filed September 8, 1896, in which latter application the novel driving mechanism of my present application was shown employed for the purpose of driving a re-sawing machine illustrated and described in said application. In my present application, therefore, I shall illustrate the same employment of my novel driving mechanism, but it will be understood that its application and utility are not limited to the purpose mentioned.

In the accompanying drawings, Figure 1 is an elevation of part of the right hand side of a re-sawing machine in which my novel driving mechanism is employed for driving the feed works of the machine; Fig. 2 a horizontal section of the same above the driving mechanism and disclosing the latter; Fig. 3 a vertical section through the driving mechanism approximately on the line 3—3 of Fig. 2; and Figs. 2$^a$ and 2$^b$ a detail view and section, respectively, showing the construction of the wheel casing or housing U.

The same letters of reference are employed to represent corresponding parts in the several views.

F is a driving shaft to which power is applied in any suitable manner. This shaft has fast upon it a step-cone pulley T', in the present instance having six steps, the one of largest diameter being at its right hand or rear end, Fig. 1, and that of smallest diameter at its left hand or forward end.

Fast upon a driven shaft J', suitably journaled above the shaft F, is a second step-cone pulley R', also having six steps, with the largest at its forward and the smallest at its rear end. Passing around the corresponding steps of the two pulleys are six belts S'', which are normally slack enough to prevent movement being transmitted by them from the shaft F to the shaft J', but any one of which may be tightened by means of a tightener pulley X' in the manner hereinafter described, when it is desired to drive the machine. If the forward belt be the one tightened the machine will be driven at its lowest rate of speed, since the forward belt passes around the largest diameter or step of the pulley R' upon the shaft J' and around the smallest diameter or step of the pulley T' upon the shaft F; while if the rearmost belt be the one tightened the machine will be driven at its highest rate of speed. By tightening one or the other of the intermediate belts the machine may be driven at any one of four intermediate speeds.

The means employed for tightening any one or another of the belts at will, for the purpose of driving the machine at the desired speed, is as follows: Located within the hollow base A of the machine, which in the present instance incloses the driving mechanism, is a rock shaft U', at the right of and parallel with the shaft F, Figs. 2 and 3. This rock shaft U' is square in cross section and is seated at its rear end in the inner end of a wheel-casing or housing U'', Fig. 2, which is mounted in a circular opening in the rear wall of the base A and is capable of turning therein as said shaft is rocked in one direction or the other. At its forward end the shaft U' is seated in the inner end of a similar wheel-casing or housing V'', which is mounted at its inner end within a hollow boss W''', projecting from the front side of the base A, and is capable of turning within such support with the rock shaft U'.

Fitted to the rock shaft U' so as to slide longitudinally of it but turn with it is a box V', Figs. 2 and 3, which has secured to or formed integrally with it a pair of vertically extending arms W' which carry the tightener pulley X' heretofore referred to. When this pulley X' is thrown to the left (to the right in Fig. 3) it will bear against one or another of the belts S'' according to the position of the box V' longitudinally of the shaft U', and serve to tighten such belt and cause the shaft F to drive the shaft J' and connected parts.

Mounted within the wheel casings or housings U'' and V'', at the opposite ends of the rock shaft U', are two sprocket wheels Y', Y'' around which passes a chain Z'' whose opposite ends are connected to the opposite sides of the box V' which slides upon the shaft U', as shown in Fig. 2, with the result that when said wheels are turned to wind the chains Z'', in one direction or the other, the box V' will be slid longitudinally of shaft U' to carry the tightener pulley X' opposite one or another of the belts S'' as desired. The rear sprocket wheel Y' is mounted upon a short spindle journaled in the casing U''', while the forward sprocket wheel Y''' is secured upon the lower end of a shaft A² which is journaled at its lower end in a tubular bearing formed integrally with and projecting above and below the casing V''', Fig. 1, and which has secured upon its upper end a hand wheel B² by which it may be turned to wind the chain Z'' in one direction or the other to bring the tightener pulley X' opposite the belts S''. When the tightener pulley has been brought opposite the desired belt in this manner, it is thrown against the same, to tighten it, by throwing the upper end of the shaft A² on downward toward the left, which will rock the shaft V' and carry the tightener against the belt. When the parts have been moved to this position, and the tightener pulley stands at the left of the vertical line of the rock shaft U', the weight of the parts will hold them in position, with the pulley bearing against the belt with sufficient pressure to produce the driving connection.

For the purpose of preventing the tightener pulley being thrown toward the belts except when it is directly opposite some single one of the belts, the box V' is provided with an arm or plate C², Figs. 2 and 3, projecting toward the right (left in Fig. 3) beneath a slotted plate D² formed integrally with and projecting inward from the base casting A and extending parallel with the rock shaft U'. There is a slot in this plate D² opposite each of the belts S'' so that when the pulley is brought opposite any belt the arm C² will be in line with one of these slots, leaving the shaft U' free to be rocked to throw the pulley against the belt, but except when the pulley is directly opposite some one belt in the series, and the arm C² in line with some one of the slots in the plate D², the shaft U' cannot be rocked for that purpose.

From the foregoing description it will be understood that the machine may be driven at any speed desired, within the limits provided, by turning the hand wheel B² on the shaft A² in one direction or the other, to adjust the tightener pulley, and then throwing it downward to the left to carry the pulley against the belt; and that when it is desired to stop the machine it is only necessary to throw the upper end of the shaft A² up and to the right, and thereby carry the tightener pulley back to normal position. In the present instance, the driven shaft J' has fast upon its front end a pinion Q' which meshes with a gear wheel P' fast upon the front end of the driving shaft H' of the feed works of the resawing machine, said shaft having fast upon its rear end a beveled pinion G' meshing with a beveled gear F' fast upon the right hand end of a shaft C'; but the shaft J' may, of course, be geared or belted to any other mechanism which is to be driven by it. In the present instance, owing to its particular employment, the shaft J' is shown mounted in laterally movable bearings at its front and rear ends, but this arrangement is merely incident to the specific employment of it illustrated, and has nothing to do with my novel driving mechanism itself.

Having thus fully described my invention, I claim:

1. The combination of a driving and a driven shaft, a cone pulley fast upon one of said shafts, a pulley upon the other shaft, a series of belts passing around said pulleys, a tightener pulley, and means for moving said tightener pulley longitudinally of said shafts and throwing it against one or another of the belts, to cause the driving shaft to drive the driven shaft at greater or less speed, as desired.

2. The combination of a driving and a driven shaft, a cone pulley fast upon the driving shaft, another cone pulley fast upon the driven shaft in reverse position to that upon the driving shaft, a series of belts passing around said pulleys, a tightener pulley, and means for moving said tightener pulley longitudinally of the shafts and throwing it against one or another of the belts, for the purpose described.

3. The combination of a driving and a driven shaft, a cone pulley fast upon one of said shafts, a pulley upon the other shaft, a series of belts passing around both of said pulleys, a rock shaft parallel to the above mentioned shafts, an arm movable longitudinally upon but turning with said rock shaft a tightener pulley carried by said arm, and means for moving said arm along the rock shaft, to bring the tightener pulley opposite one or another of the belts, and for rocking the shaft to throw the pulley against such belt, for the purpose described.

4. The combination of a driving and a driven shaft, a cone pulley fast upon the driving shaft, another cone pulley fast upon the driven shaft in reverse position to that upon the driving shaft, a series of belts around said pulleys, a rock shaft parallel with said driving and driven shafts, an arm movable longitudinally upon but turning with said rock shaft a tightener pulley carried by said arm, and means for moving the arm along the rock shaft, to bring it opposite one or another of the belts, and for rocking the shaft to throw it against such belt, for the purpose described.

5. The combination of a driving and a driven shaft, a cone pulley fast upon one of said shafts, a pulley upon the other shaft, a series of belts passing around said pulleys, a rock shaft parallel to the first mentioned shafts, an arm movable longitudinally upon but turning with said rock shaft a tightener pulley carried by said arm, a pair of wheels located at the opposite ends of said shaft, a chain passing around said wheels and having its ends connected to the arm carrying the tightener pulley, and means for turning one of said wheels and rocking the shaft, to move the tightener pulley opposite one or another of the belts and to throw it against such belt, for the purpose described.

6. The combination of a driving and a driven shaft, a cone pulley fast upon the driving shaft, another cone pulley fast upon the driven shaft in reverse position to that upon the driving shaft, a series of belts passing around said pulleys, a rock shaft parallel to the first mentioned shafts, an arm movable longitudinally upon but turning with said rock shaft a tightener pulley carried by said arm, a pair of wheels located at the opposite ends of said shaft, a chain passing around said wheels and having its ends connected to the arm carrying the tightener pulley, and means for turning one of said wheels and rocking the shaft, to move the tightener pulley opposite one or another of the belts and to throw it against such belt, for the purpose described.

7. The combination of a driving and a driven shaft, a cone pulley fast upon one of said shafts, a pulley upon the other shaft, a series of belts passing around said pulleys, a tightener pulley, means for moving said tightener pulley longitudinally of said shafts and throwing it against one or another of the belts, as desired, and means coöperating with said pulley to prevent it being thrown toward the belts except when brought to proper position directly opposite some one of the belts.

8. The combination of a driving and a driven shaft, a cone pulley fast upon the driving shaft, another cone pulley fast upon the driven shaft in reverse position to that upon the driving shaft, a series of belts passing around said pulleys, a tightener pulley, means for moving said tightener pulley longitudinally of said shafts and throwing it against one or another of the belts, as desired, and means coöperating with said pulley to prevent it being thrown toward the belts except when brought to proper position directly opposite some one of the belts.

9. The combination of a driving and a driven shaft, a cone pulley fast upon one of said shafts, a pulley upon the other shaft, a series of belts passing around said pulleys, a rock shaft parallel to said first mentioned shafts, an arm movable longitudinally upon said rock shaft but turning therewith, a tightener pulley carried by said arm, means for moving the arm along the rock shaft and for rocking the shaft to throw the pulley against the belts, and a slotted plate coöperating with a part moving with said tightener pulley arm to prevent rocking of the shaft to throw the tightener pulley against the belts except when said pulley stands in proper position opposite some one of the belts.

10. The combination of a driving and a driven shaft, a cone pulley fast upon the driving shaft, another cone pulley fast upon the driven shaft in reverse position to that upon the driving shaft, a series of belts passing around said pulleys, a rock shaft parallel to said first mentioned shafts, an arm movable longitudinally upon said rock shaft but turning therewith, a tightener pulley carried by said arm, means for moving the arm along the rock shaft and for rocking the shaft to throw the pulley against the belts, and a slotted plate coöperating with a part moving with said tightener pulley arm to prevent rocking of the shaft to throw the tightener pulley against the belts except when said pulley stands in proper position opposite some one of the belts.

11. The combination of the shaft $J'$, the cone pulley $R'$ fast upon said shaft, the driving shaft $F$, the cone pulley $T'$ fast thereon in reverse position to the pulley $R'$, the belts $S''$ passing around the two pulleys, a rock-shaft $U'$, an arm $W'$ movable longitudinally upon but turning with said shaft the tightener pulley $X'$ carried by said arm, the wheel casings $U''$ $V''$ mounted in bearings at the opposite ends of the rock-shaft to turn with the latter, the wheel $Y'$ mounted in the casing $U''$, the shaft $A^2$ journaled in the casing $V''$, the wheel $Y''$ fast upon it within said casing, the hand wheel $B^2$ for turning it, and the chain $Z''$ passing around the wheels $Y'$ $Y''$ and connected at its opposite ends to the arm $W'$ carrying the tightener pulley $X'$, substantially as and for the purpose described.

12. The combination of the shaft $J'$, the cone pulley $R'$ fast upon said shaft, the driving shaft $F$, the cone pulley $T'$ fast thereon in reverse position to the pulley $R'$, the belts $S''$ passing around the two pulleys, a rock-shaft $U'$, an arm $W'$ movable longitudinally upon but turning with said shaft the tightener pulley $X'$ carried by said arm, the arm $C^2$ movable longitudinally upon the rock-shaft $U'$ with the arm $W'$ and turning with the shaft, the fixed slotted plate $D^2$ coöperating with the arm $C^2$, and means for moving the arm $W'$ longitudinally of the rock shaft, to bring the tightener pulley opposite one or another of the belts, and for rocking the shaft to carry the pulley against such belt, substantially as described.

13. In a re-sawing machine, the combination of a shaft $J'$, the cone pulley $R'$ fast upon said shaft, the driving shaft $F$, the cone pulley $T'$ fast thereon in reverse position to the pulley $R'$, the belts $S''$ passing around the two pulleys, the rock-shaft $U'$, square in cross-section and secured at its opposite ends in the wheel casings $U''$ $V''$ mounted in bearings in the framework so as to turn with the shaft, the box V' fitting upon the rock-shaft U' and movable longitudinally thereon, the arm W' projecting from said box the tightener pulley X' carried by said arm, the arm $C^2$ also projecting from said box, the slotted plate $D^2$ coöperating with the arm $C^2$, the wheel Y' mounted in the casing U'' at one end of the rock-shaft, the shaft $A^2$ journaled at its lower end in the casing V'', the hand wheel $B^2$ at the upper end of said shaft for turning it, the wheel Y'' fast upon the shaft $A^2$ within the casing V'', and the chain Z'' passing around the wheels Y' and Y'' and connected to the box V' upon the rock-shaft U', substantially as and for the purpose described.

14. In a driving mechanism, the combination of a pair of cone pulleys positioned with their belt surfaces in reverse order, a series of belts passing around said pulleys, and means common to all of said belts for tightening any one of them independently of the others for causing said particular belt to transmit power from one pulley to the other.

HENRY J. GILBERT.

Witnesses:
ARNOLD BOUTELL,
H. M. HAMMOND.